(12) United States Patent
Stahl, Sr. et al.

(10) Patent No.: US 7,596,914 B2
(45) Date of Patent: Oct. 6, 2009

(54) UNIVERSAL FIRESTOPPING COLLAR ASSEMBLY

(75) Inventors: James P. Stahl, Sr., Stockton, NJ (US); James P. Stahl, Jr., Princeton Junction, NJ (US)

(73) Assignee: Specified Technologies, Inc., Somerville, NJ (US)

( * ) Notice: Subject to any disclaimer, the term of this patent is extended or adjusted under 35 U.S.C. 154(b) by 563 days.

(21) Appl. No.: 11/304,464

(22) Filed: Dec. 15, 2005

(65) Prior Publication Data

US 2007/0151183 A1    Jul. 5, 2007

(51) Int. Cl.
E04C 2/52 (2006.01)
(52) U.S. Cl. ............................ 52/220.8; 52/232
(58) Field of Classification Search .............. 52/232, 52/220.8, 58, 198, 219; 403/241, 393, 409.1; 248/224.8, 222.41, 223.21, 225.21
See application file for complete search history.

(56) References Cited

U.S. PATENT DOCUMENTS

| | | | |
|---|---|---|---|
| 3,161,210 A | 12/1964 | Loof | |
| 3,347,276 A | 10/1967 | Dunn | |
| 3,486,534 A | 12/1969 | Terkel et al. | |
| 3,757,031 A | 9/1973 | Izraeli | |
| 3,886,981 A | 6/1975 | Eliason | |
| 3,903,931 A | 9/1975 | Moulin et al. | |
| 4,091,231 A | 5/1978 | Sotolongo | |
| 4,249,353 A | 2/1981 | Berry | |
| 4,557,510 A | 12/1985 | Overmyer | |
| 4,563,847 A | 1/1986 | Hasty | |
| 4,916,800 A | 4/1990 | Harbeke | |
| 4,951,442 A * | 8/1990 | Harbeke, Jr. | ............... 52/745.2 |
| 5,020,481 A | 6/1991 | Nelson | |
| 5,058,341 A | 10/1991 | Harbeke, Jr. | |
| 5,103,609 A * | 4/1992 | Thoreson et al. | ............... 52/232 |
| 5,143,408 A | 9/1992 | Holtsmark | |
| 5,222,334 A | 6/1993 | Hasty | |
| 5,417,901 A | 5/1995 | Hartman et al. | |
| 5,465,759 A | 11/1995 | Carlson et al. | |
| 5,775,379 A | 7/1998 | Manofsky et al. | |
| 5,887,395 A | 3/1999 | Navarro et al. | |
| 5,887,396 A * | 3/1999 | Thoreson | ..................... 52/232 |
| 5,905,231 A | 5/1999 | Houte et al. | |
| 5,947,159 A | 9/1999 | Takahashi | |
| 5,970,670 A * | 10/1999 | Hoffman | ..................... 52/232 |
| 6,029,412 A * | 2/2000 | Gohlke | ........................ 52/232 |
| 6,034,329 A | 3/2000 | Kawamura | |
| 6,044,572 A * | 4/2000 | Sore et al. | .................. 33/555.4 |
| 6,078,009 A | 6/2000 | Kawamura | |

(Continued)

Primary Examiner—Gay Ann Spahn
Assistant Examiner—Joshua Ihezie
(74) Attorney, Agent, or Firm—Sperry, Zoda & Kane

(57) ABSTRACT

A collar positionable about a panel penetrating member for sealing therearound and particularly for firestopping therearound which prevents the flow of smoke and may include an intumescent component for expansion during exposure to heat. A collar assembly is usable with members penetrating various types of panels including walls, ceilings and floors. The sealing member of the assembly includes frangible zones with removable sections which are mated to the construction of the mounting strap. The mounting strap includes engagement prongs and multiple engagement apertures securable with respect to one another in various relative positions for use with respect to panel penetrating members of various standardized sizes. The engagement of the prongs in various apertures is mated with the frangible zones on the sealing member for effective sealing around panel penetrating members of standardized sizes such as 3 inch, 3½ inch, 4 inch and 4½ inch and others.

16 Claims, 4 Drawing Sheets

U.S. PATENT DOCUMENTS

| | | |
|---|---|---|
| 6,175,078 B1 | 1/2001 | Bambardekar |
| 6,182,706 B1 | 2/2001 | Tako et al. |
| 6,315,005 B1 | 11/2001 | Sproule, III |
| 6,382,260 B1 | 5/2002 | Sproule, III |
| 6,431,216 B1 | 8/2002 | Briscoe |
| 6,725,615 B1 * | 4/2004 | Porter ............ 52/232 |
| 6,752,176 B1 | 6/2004 | Price et al. |
| 6,904,941 B2 | 6/2005 | Howard |
| 2002/0056242 A1 * | 5/2002 | Andresen ............ 52/220.8 |

* cited by examiner

UNIVERSAL FIRESTOPPING COLLAR ASSEMBLY

BACKGROUND OF THE INVENTION

1. Field of the Invention

The present invention deals with the field of devices for sealing around penetrating members which extend through panels in commercial and residential structures. Such penetrating members can be used for providing electronic communication surrounding plumbing fixtures, surrounding electrical lines or any other device that would need to penetrate the walls, ceilings or floors of structures.

The universal firestopping collar assembly of the present invention is designed to extend around these wall, ceiling or floor penetrating members for preventing the flow of smoke thereby or preventing fire from passing through such apertures if the building is burning. The sealing member of the collar assembly can include an intumescent component such as an intumescent foam material which expands responsive to exposure to such heat to further facilitate this sealing. However, even without the intumescent component, the apparatus of the present invention is usable since the material of the sealing member prevents the flow of smoke thereby which is an important initial consideration at such times.

2. Description of the Prior Art

Many devices have been designed for the purpose of firestopping around specifically sized panel penetrating members for extending through walls, ceilings arid/or floors such as U.S. Pat. No. 3,161,210 patented Dec. 15, 1964 to N. O. T. Loof on "Plastic Strips"; and U.S. Pat. No. 3,347,276 patented Oct. 17, 1967 to V. R. Dunn on a "Pipe Jacket Construction"; and U.S. Pat. No. 3,486,534 patented Dec. 30, 1969 to M. Terkel et al and assigned to Ultronix, Inc. on "Insulated Pipeline Jacketing Systems"; and U.S. Pat. No. 3,757,031 patented Sep. 4, 1973 to H. Izraeli and assigned to Thomas & Betts Corporation on a "Selectively Closable Protective Enclosure For Electrical Splices And The Like"; and U.S. Pat. No. 3,886,981 patented Jun. 3, 1975 to K. E. Eliason and assigned to Atlantic Richfield Company on a "Pipeline Insulation Means"; and U.S. Pat. No. 3,903,931 patented Sep. 9, 1975 to M. Moulin et al and assigned to Commissariat a l'Energie Atomique on a "Sleeve Having Deformable Walls"; and U.S. Pat. No. 4,091,231 patented May 23, 1978 to T. J. Sotolongo and assigned to Thomas & Betts Corporation on an "Adjustable Floor Receptacle"; and U.S. Pat. No. 4,249,353 patented Feb. 10, 1981 to R. C. Berry and assigned to Crouse-Hinds Company on a "Fire Barrier Assembly For Electrical Cable"; and U.S. Pat. No. 4,557,510 patented Dec. 10, 1985 to S. R. Overmyer and assigned to Francesville Drain Tile Corporation on a "Corrugated Tube Coupling"; and U.S. Pat. No. 4,563,847 patented Jan. 14, 1986 to W. E. Hasty and assigned to W F Products Corporation on "Universal Flashing For Roof Vent Pipes"; and U.S. Pat. No. 5,020,481 patented Jun. 4, 1991 to T. E. Nelson et al on a "Thermal Insulation Jacket"; and U.S. Pat. No. 5,143,408 patented Sept. 1, 1992 to E. B. Holtsmark on a "Variable Size Pipe Connector"; and U.S. Pat. No. 5,222,334 patented Jun. 29, 1993 to W. E. Hasty on a "Multiple Size Vent-Pipe Elastomeric Collar"; and U.S. Pat. No. 5,417,901 patented May 23, 1995 to D. Hartman et al and assigned to Industrial Thermo Polymers Limited on a "Method Of Forming Pipe Insulation With Prestressed Tape Closure"; and U.S. Pat. No. 5,465,759 patented Nov. 14, 1995 to D. W. Carlson et al and assigned to Hydril Company on a "Variable Diameter Pipe Protector"; and U.S. Pat. No. 5,775,379 patented Jul. 7, 1998 to W. L. Manofsky et al and assigned to Applied Materials, Inc. on "Insulation Jacket For Fluid Carrying Conduits"; and U.S. Pat. No. 5,905,231 patented May 18, 1999 to B. Houte et al and assigned to A. Raymond & Cie; and U.S. Pat. No. 6,034,329 patented Mar. 7, 2000 to S. Kawamura and assigned to Sumitomo Wiring Systems, Ltd. on a "Corrugated Tube And An Automatic Wire-Loading Device Therefor"; and U.S. Pat. No. 6,044,572 patented Apr. 4, 2000 to J. D. Sore et al on a "Pipe Ruler"; and U.S. Pat. No. 6,078,009 patented Jun. 20, 2000 to S. Kawamura and assigned to Sumitomo Wiring Systems, Ltd. on a "Corrugated Tube"; and U.S. Pat. No. 6,175,078 patented Jan. 16, 2001 to S. S. Bambardekar et al and assigned to Walker Systems, Inc. on a "Flush Poke-Through Wiring Fitting Having A Height Adjustable Data Jack Mounting Bracket"; and U.S. Pat. No. 6,182,706 patented Feb. 6, 2001 to A. Tako et al and assigned to A. J. Gerrard & Company on a "Piping Jacket"; and U.S. Pat. No. 6,315,005 patented Nov. 13, 2001 to C. G. Sproule, III on "Water Resistant Adjustable Jackets For Insulated Pipe Bends"; and U.S. Pat. No. 6,382,260 patented May 7, 2002 to C. G. Sproule, III on "Water Resistant Adjustable Jackets For Insulated Pipe Bends"; and U.S. Pat. No. 6,431,216 patented Aug. 13, 2002 to T. L. Briscoe on a "Protective Tube Assembly"; and U.S. Pat. No. 6,752,176 patented Jun. 22, 2004 to T. Price et al on an "Adjustable Adapter For Pipe Insulation Cladding"; and U.S. Pat. No. 6,904,941 patented Jun. 14, 2005 to D. W. Howard on a "Helically Formed Cylinder Of Varying Length And Diameter".

SUMMARY OF THE INVENTION

The firestopping collar assembly of the present design is universal in that it provides for sealing about panel penetrating members of various sizes. It is usable for penetration through panels of floors, walls and/or ceilings or other similar constructions.

The assembly includes a sealing member of firestopping foam material which is preferably intumescent which extends longitudinally and defines a plurality of frangible zones extending laterally thereacross. These frangible zones are spaced apart from one another longitudinally along the sealing member to facilitate sealing around panel penetrating members of various different sizes, shapes and configurations. Each of the frangible zones preferably extends around the sealing member in such a manner as to define therebetween a plurality of individual removable sections of the sealing member. The sealing member is breakable along any of these frangible zones to remove at least one of the frangible member sections in order to allow effective sealing around different sizes and particularly smaller sizes than the size with all removable sections still attached. The sealing member is preferably made of a firestopping foam material which is operable to prevent the passage of smoke thereby or therethrough. The frangible zones on the sealing member preferably can include sealing member perforations or sealing member slits which facilitate breaking of the sealing member laterally thereacross without the use of any specific tools. This breaking can be performed merely manually.

The assembly of the present invention further includes a mounting strap which is preferably made of a flexible steel material in order to facilitate urging of the sealing member into engaging abutment surrounding the panel penetrating member immediately adjacent the panel. The mounting strap will preferably include a compression surface with the sealing member secured thereto and extending longitudinally therealong. This compression surface will be positionable preferably facing the panel penetrating member to facilitate urging of the sealing member in firm abutment thereagainst. The mounting strap will also define an outer surface located oppositely from the compression surface facing outwardly from the panel member when positioned about a panel penetrating member. A securement edge is also defined positioned between and along the compression surface and the outer surface. Oppositely located will be a retaining edge also positioned between the compression surface and the outer surface but spatially disposed away from the securement edge.

A plurality of securement tabs will be preferably secured to the securement edge and extend outwardly therefrom to facilitate holding of the sealing member in abutment with and surrounding the panel penetrating member. Each of these securement tabs preferably defines a securement aperture defined therein to facilitate securement of the assembly with respect to the panel surrounding the panel member preferably by penetrating fasteners such as screws, nails or the like. The mounting strap will include a first end area which includes engagement prongs extending outwardly therefrom. Each of these engagement prongs preferably includes an inner prong member and an outer prong member spatially disposed laterally with respect to one another across the outer surface of the first end area of the containment strap in such a manner as to extend outwardly from the outer surface to facilitate securement thereto. Each of these engagement prongs preferably is tapered from a wider prong section immediately adjacent the containment strap to a narrower prong section more distant from the containment strap to facilitate penetration and engagement therewith. The mounting strap will also include a second end area spatially disposed and preferably opposite from the first end area which defines a plurality of individual engagement apertures therein defined spaced apart from one another longitudinally therealong. Each of these engagement apertures is adapted to receive an engagement prong extending therein for engagement therewith in order to secure the first end area and the second end area together while extending around the sealing member and the panel penetrating member for biasing them together to facilitate sealing therearound. Each of the engagement apertures are positioned spatially disposed longitudinally with respect to one another along the second end area of the mounting strap to facilitate use of the mounting strap with panel penetrating members of various sizes and configurations. The second end area of the containment strap is positionable extending overlapping the outer surface of the first end area thereof to facilitate engagement between the engagement prong and selectively one of the engagement apertures. Each of the engagement apertures includes an inner engagement aperture and an outer engagement aperture wherein each is spatially disposed laterally with respect to one another across the second end area of the containment strap. The use of two such engagement apertures at each engagement aperture location is the preferred configuration to facilitate securement. With this construction the inner prong member is adapted to extend through the inner engagement aperture and the outer prong member is adapted to extend through the outer engagement aperture to facilitate engagement between the first end area and the second end area in the overlapping position for surrounding the sealing member and urging thereof against the panel penetrating member positioned therewithin.

In the preferred configuration each of the engagement apertures is tapered from a wider aperture end section to a narrower aperture end section to facilitate securement thereof with respect to the engagement prong positioned extending therethrough. The narrower prong section and the wider aperture end section facilitate entry of the engagement prong into the engagement aperture and the wide prong section and the narrow aperture end section facilitate engagement of the engagement prong with respect to the engagement aperture. Each of the engagement prongs are movable into engagement with the engagement aperture by extending therethrough and being bent downwardly extending over the outer surface of the outer strap for securement therewith. The frangible zones of the sealing member are defined along the sealing member in such a manner in order to allow the sealing member to seal substantially completely around a panel penetrating member responsive to engagement of the engagement prong with respect to any one of the plurality of engagement aperture areas to facilitate sealing around the various different sizes and configurations of panel penetrating members.

A plurality of retaining projections are preferably included with the assembly of the present invention which are secured to the retaining edge of the containment strap and extend away therefrom along the sealing member to facilitate retaining and securement with respect to the compression surface of the mounting strap for further urging thereof into surrounding abutment with respect to the panel penetrating member. These retaining projections preferably are positioned such that they extend inwardly from the retaining edge and are oriented approximately perpendicularly with respect to the compression surface for the purpose of facilitating retaining of the sealing member in position against the compression surface for enhancing guiding thereof into engaging abutment in position surrounding the panel penetrating member adjacent the panel itself.

It is an object of the present invention to provide a universal firestopping collar assembly for sealing about a panel penetrating member which is usable with various different panels including wall panels, ceiling panels or floor panels.

It is an object of the present invention to provide a universal firestopping collar assembly for sealing about a panel penetrating member which includes a sealing member capable of preventing the flow of smoke therethrough or thereby.

It is an object of the present invention to provide a universal firestopping collar assembly for sealing about a panel penetrating member which includes a sealing member which can include an intumescent component for facilitating expansion thereof during exposure to heat to facilitate firestopping.

It is an object of the present invention to provide a universal firestopping collar assembly for sealing about a panel penetrating member which can be used with various different sizes and configurations of panel penetrating members and is conveniently adapted for such various usages.

It is an object of the present invention to provide a universal firestopping collar assembly for sealing about a panel penetrating member which includes frangible zones for easily adjusting the length of the sealing member to pre-specified lengths to be usable with conventionally sized panel penetrating members.

It is an object of the present invention to provide a universal firestopping collar assembly for sealing about a panel penetrating member which includes a mounting strap which has an engagement prong which can be positioned with respect to variously spaced apart engagement apertures to facilitate use of the mounting strap with various pre-specified conventional sizes of the panel penetrating members.

It is an object of the present invention to provide a universal firestopping collar assembly for sealing about a panel penetrating member which can be utilized with one or more individual sealing members positioned within the mounting strap thereof to facilitate sealing.

It is an object of the present invention to provide a universal firestopping collar assembly for sealing about a panel penetrating member which can be easily secured with respect to a panel penetrating member extending through a wall, ceiling or floor.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
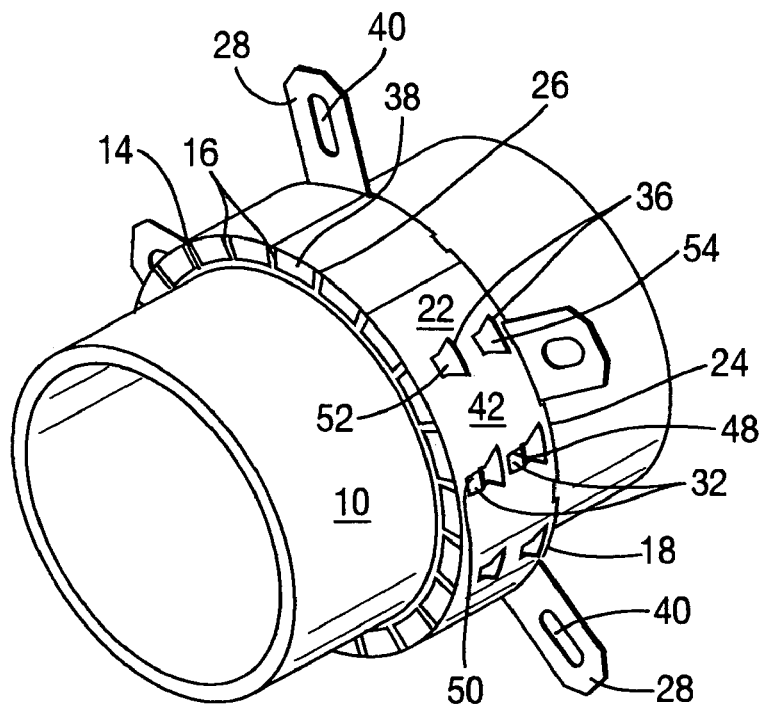
FIG. 1 is a front three-quarter perspective illustration showing the universal firestopping collar assembly of the present invention in position about a panel penetrating member.
Figure 2:
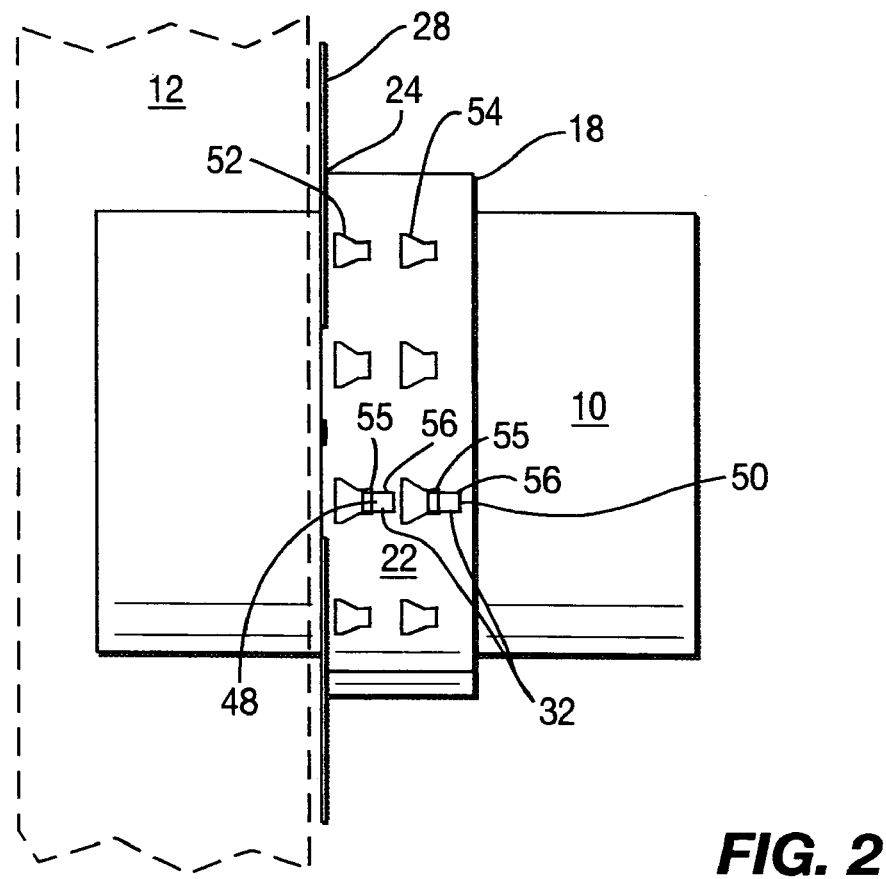
FIG. 2 is a side plan view of the embodiment shown in FIG. 1.
Figure 3:
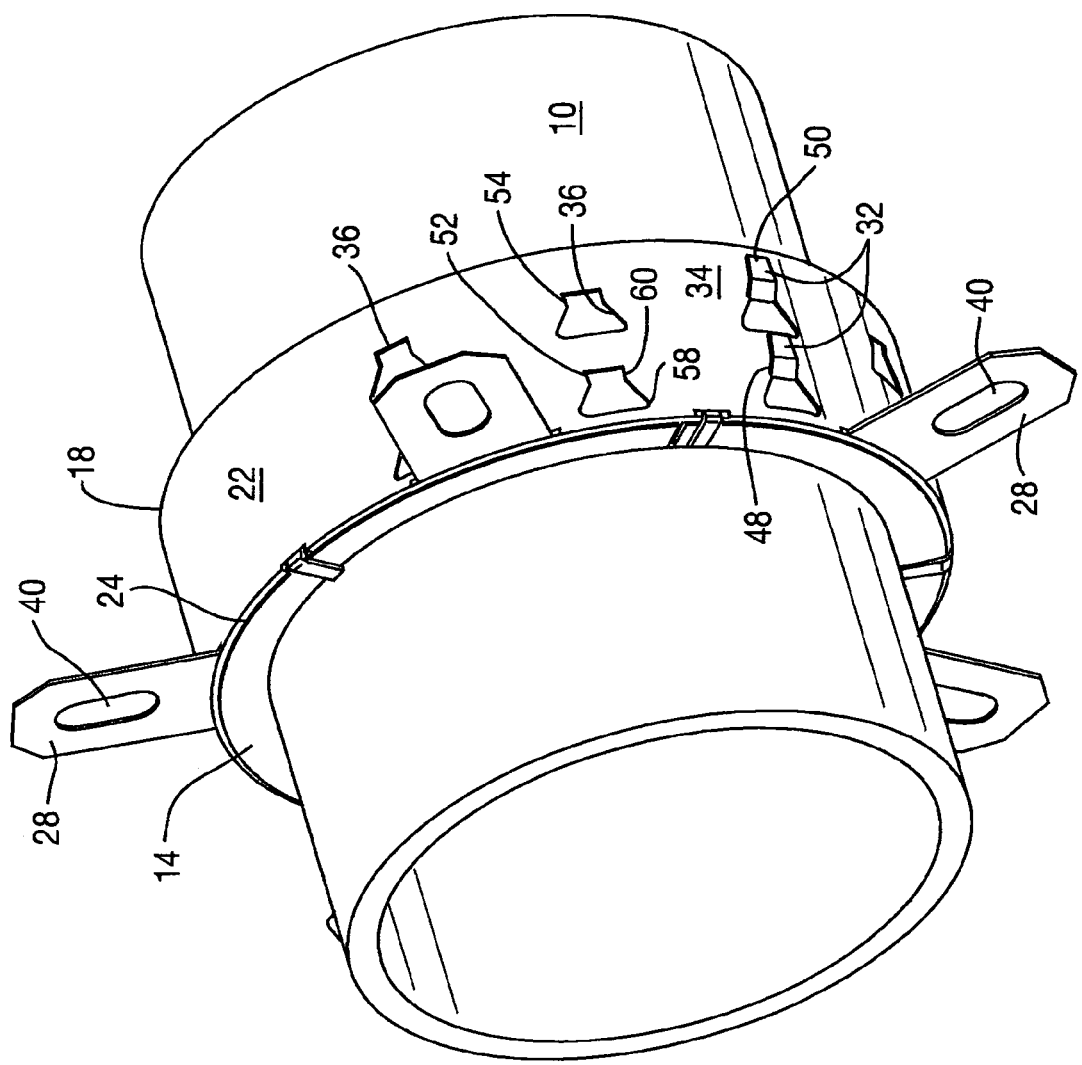
FIG. 3 is a three-quarter perspective view taken from the rear of the embodiment shown in FIG. 1.
Figure 5:
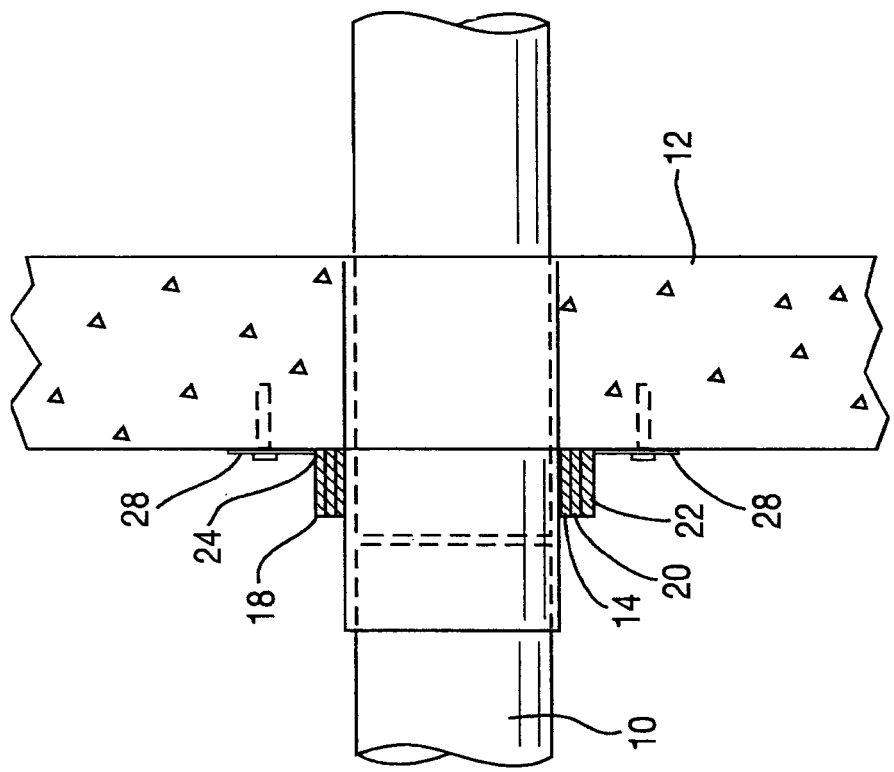
FIG. 5 is a side cross sectional view showing a universal firestopping collar assembly of the present invention extending about a panel penetrating member showing the panel penetrating member and the panel.
Figure 4:
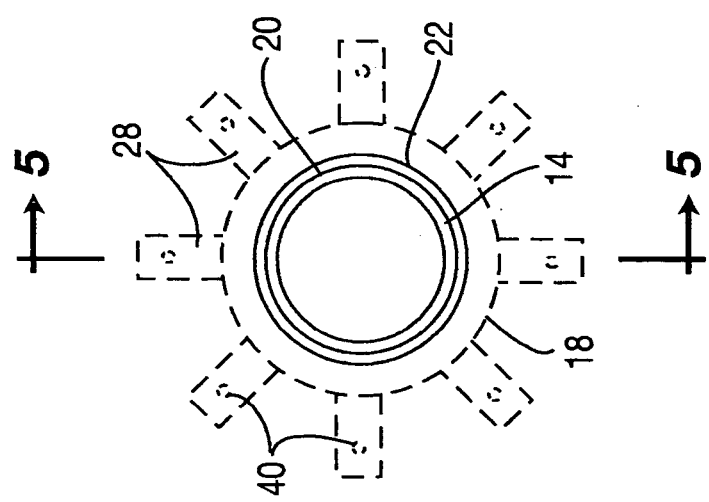
FIG. 4 is a top plan view looking downwardly onto the embodiment shown in FIG. 1.
Figure 6:
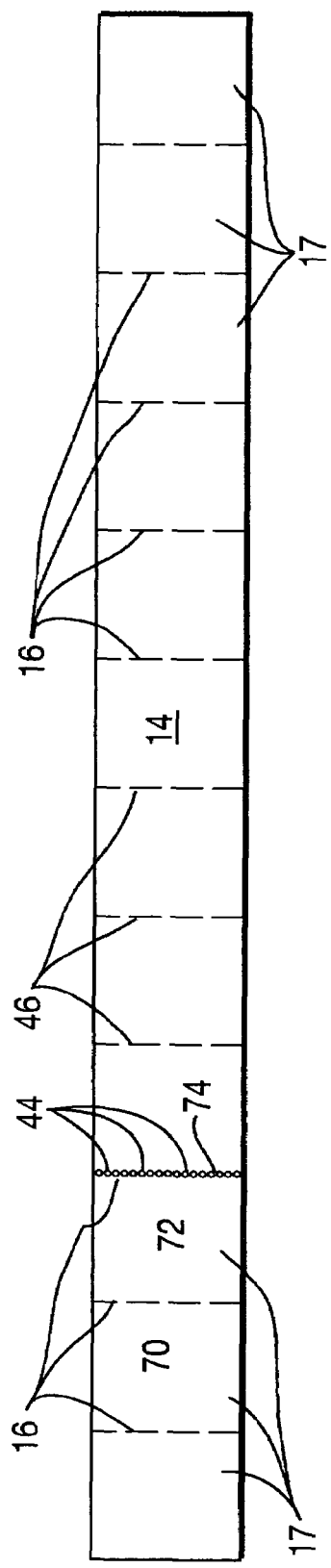
FIG. 6 is a top plan view of an embodiment of the sealing member of the present invention.
Figure 7:
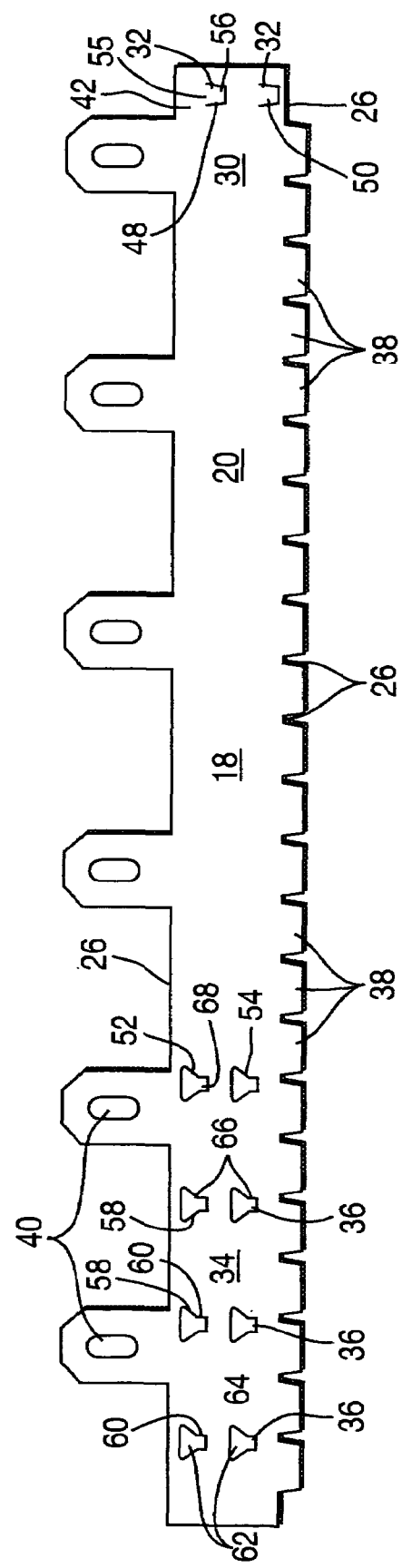
FIG. 7 is a top plan view of an embodiment of the mounting strip in flat form of the present invention.

The universal firestopping collar assembly of the present invention includes a sealing member 14 adapted to be positioned around a panel penetrating member 10 extending through a panel 12 wherein such panels can comprise walls, floors or ceilings. The sealing member 14 includes a plurality of frangible zones 16 to allow for the possible easy removal of one or more removable sections 17 for allowing the sealing member 14 to be usable with various different sizes of panel penetrating members such as diameters of anywhere from one inch to five inches but usually in the area of 3 to 4½ inches. One of the unique aspects of the present invention is in the capability of the collar assembly to be usable with a wide range of different sizes of penetrating members 10 in an easy and convenient manner by providing frangible zones 16 at various locations thereof wherein the locations are chosen specifically to be usable with the more standard sizes with which the sealing member 14 will most likely be utilized in most applications. These frangible zones 16 preferably are formed by the defining of a plurality of member perforations 44 or member slits 46 defined extending laterally across the sealing member 14 such that the sealing member 14 can be easily fractured without the use of any specific cutting tool but merely manually.

The positioning of the sealing member 14 in abutment with respect to the panel penetrating member 10 is achieved by the inclusion of a mounting strap 18. The mounting strap 18 preferably includes a compression surface 20 which is adapted to abut said sealing member 14 with said sealing member 14 secured thereto such as by clips, adhesive or any other conventional manner. The compression surface 20 of mounting strap 18 will be movable toward the sealing member 14 when positioned about a panel penetrating member 10 for urging compression thereof to facilitate sealing therearound.

Mounting strap 18 will include an outer surface 22 on the opposite facing surface of the compression surface 20 facing outwardly therefrom. A securement edge 24 will be defined along one edge of the mounting strap 18 to facilitate securement with respect to the panel penetrating member 10 and particularly the panel 12 therearound and will also include a retaining edge 26 which can include a means for guiding and securement of the sealing member 14 with respect to the compression surface 20 thereadjacent. Preferably the securement edge 24 and the retaining edge 26 will be the opposite lateral edges of the mounting strap 18.

A plurality of securement tabs 28 will preferably extend outwardly from the securement edge 24 of the mounting strap 18. These securement tabs 28 will preferably define securement apertures 40 therewithin through which standard penetrating fasteners can extend such as screws, nails and the like for fixedly securing the securement edge 24 of the mounting strap 18 with respect to the panel 12 in position surrounding the panel penetrating member 10.

The retaining edge 26 preferably includes a plurality of retaining projections 38 which extend inwardly therefrom approximately perpendicularly with respect to the compression surface 20 of the mounting strap 18 to facilitate holding of the sealing member 18 in abutment with the compression surface 20 as it compresses the sealing member 14 against the panel penetrating member 10 and prevents it from moving outwardly therefrom responsive to such compression.

The construction of the mounting strap 18 particularly includes a first end area 30 which defines preferably an engagement prong 32 defined therein. The configuration of this engagement prong 32 is preferably such that it is stamped from the material of the first end area 30 of the mounting strap 18 and extends outwardly therefrom. Also preferably the structure of the engagement prong 32 is such that the portion thereof immediately adjacent the mounting strap 18 is a wider prong section 55 whereas the portion thereof more spatially distant from the mounting strap 18 is a narrower prong section 56. With this construction the engagement prong 32 will taper to a smaller dimension at distances further and further from the mounting strap 18. This tapered construction facilitates engagement of the engagement prong means 32 with respect to apertures defined in the mounting strap 18 and described herebelow.

The opposite longitudinal end of the mounting strap 18 from the first end area 30 will be defined as the second end area 34. The second end area 34 preferably defines a plurality of engagement aperture means 36 therewithin. Each of these engagement aperture means preferably includes two separate apertures, namely, an inner engagement aperture 52 and an outer engagement aperture 54 positioned laterally adjacent to one another however forming the same overall attachment means. With this configuration the individual engagement prongs 32 will each include an inner prong member 48 and an outer prong member 50 also laterally spaced with one another. With this construction the inner prong member 48 will be designed to extend into and through the inner engagement aperture 52 while the outer prong member 50 will be adapted to extend into the outer engagement aperture 54 for facilitating firm securement between the engagement prong means 32 and the securement aperture means 40. This engagement will occur due to the fact that the second end area 34 of the mounting strap 18 will include an overlapping area 42 which overlaps the first end area 30 thereof and allows engagement of the pair of engagement prongs 32 with respect to the pair of securement apertures 40. While the present invention is usable with a single engagement prong 32 engaging a single securement aperture 40, the inclusion of inner and outer both prong members and engagement apertures 48, 50, 52 and 54 does certainly enhance the engagement between the first end area 30 and the second end area 34 in the overlapped position 42.

Engagement can further be enhanced by defining each of the engagement apertures 36 with a wider aperture end section 58 at one lateral edge thereof and a narrower aperture end section 60 at the opposite end thereof. With this construction the narrower prong section 56 and the wider aperture end section 58 will facilitate entry of the engagement prong 32 into the engagement aperture 36. Also the wider prong section 55 and the narrower aperture end section 60 will facilitate engagement of the engagement prong 32 with respect to the engagement aperture 36. In other words, the narrow portion of the prong and the wide portion of the apertures will facilitate the prong extending through the aperture whereas the wider portion of the prong and the narrow portion of the aperture will facilitate engagement therebetween after insertion has been achieved.

In a most preferred configuration of the present design the four separate engagement apertures may be included, namely, the first engagement aperture 62 and the second engagement aperture 64 and the third engagement aperture 66 and the fourth engagement aperture 68. Each of these engagement apertures can provide securement with respect to the engagement prong 32 for use with various different standardized sizes of panel penetrating members 10. For example, the first engagement aperture 62 can be positioned such that engagement with the engagement prong 32 allows usage of the mounting strap 18 surrounding a 4½ inch diameter panel penetrating member. Similarly the second engagement aperture 64 can be usable with a 4 inch diameter penetrating member 10 and the third engagement aperture 66 can be used for securement about a 3½ inch diameter panel penetrating member 10 and finally the fourth engagement aperture 68 can be usable extending about a 3 inch diameter panel penetrating member 10.

Similarly the sealing member can include a first frangible zone 70 and a second frangible zone 72 and a third frangible zone 74 for the same example described hereabove. In this example, when the engagement prong 32 extends through the first engagement aperture means 62 the original sizing of the sealing member 14 will be utilized. However, when the engagement prong 32 extends through the second engagement aperture 64, the sealing member 14 will be fractured along the first frangible zone 70 for use positioning about a panel penetrating member 10 of approximately 4 inches in diameter. Furthermore the sealing member 14 will be fractured along the second frangible zone 72 thereof whenever the engagement prong 32 is designed to extend through the third engagement aperture 66 for use with a panel penetrating member 10 having a diameter of approximately 3½ inches. Finally the third frangible zone 74 will be fractured to reduce the size of the longitudinal length of the sealing member 14 such that it can be more easily used with the mounting strap 18 whenever the engagement prong 32 thereof is positioned in engagement with respect to the fourth engagement aperture 68 for use particularly with a panel penetrating member 10 having a diameter of approximately 3 inches.

It should also be appreciated that panel penetrating members 10 which extend through the panels 12 often vary in size along the longitudinal length thereof. Most particularly this variation in size occurs where a joint or connecting member is used. Sometimes a connecting member is present at the interface where a panel penetrating member 10 exits a panel 12 such as a wall area and provides an enlarged area. This area can be measured and the appropriate engagement aperture can be utilized and the appropriate frangible zone can also be chosen for fracturing such that the mated configuration of the mounting strap 18 and the sealing member 14 is usable with respect to even the enlarged section of the panel penetrating member 10 adjacent to the panel 12. While these examples show usage of the apparatus of the present invention with panel penetrating member of 3 inch to 4½ inches in diameter, use with larger panel penetrating members 10 and penetrating member of various small sizes is also certainly possible with a similar construction as defined herein. It should also be appreciated that it is not uncommon for more than one individual sealing member 14 to be usable positioned within the mounting strap 18 to further enhance firestop sealing between the panel penetrating member 10 and the panel 12 in certain particular applications. With such applications the correspondence between the particular frangible zone and engagement aperture utilized will be appropriately modified. The use of the assembly of the present invention greatly minimizes the inventory that needs to be maintained by a firestopping contractor in view of the fact that one single assembly is utilized with various different sizes of panel penetrating members. Also the assembly of the present invention may be utilized with panels 10 of various different constructions such as wallboard, sheetrock, plaster, cement, fiberboard or any other materials with appropriate attention being given to positioning and sealing therearound responsive to the particular application.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

We claim:

1. A universal firestopping collar assembly for sealing about a panel penetrating member comprising:

A. a sealing member of firestopping material extending longitudinally and defining a plurality of frangible zones directly in the firestopping material of said sealing member extending partially laterally thereacross and spatially disposed from one another to facilitate sealing around panel penetrating members of various sizes and configurations, each of said frangible zones extending across said sealing member at spatially disposed positions to define longitudinally therebetween a plurality of individual removable member sections, said sealing member being breakable along any one of said frangible zones to remove at least one of said removable member sections in order to provide adjustment in the total longitudinal length of said sealing member to facilitate installation thereof in surrounding engagement with panel penetration members of various different sizes;

B. a mounting strap of flexible material to facilitate urging of said sealing member into engaging abutment surrounding a panel penetrating member immediately adjacent a panel, said mounting strap including:

(1) a compression surface with said sealing member secured with respect thereto and extending longitudinally therealong, said compression surface being positionable facing the panel penetrating member to facilitating urging of said sealing member in abutting contact thereagainst;

(2) an outer surface located oppositely from said compression surface and facing outwardly away from the panel penetrating member responsive to positioning of said compression surface of said mounting strap facing the panel penetrating member for urging said sealing member into a surrounding position thereadjacent;

(3) a securement edge positioned between said compression surface and said outer surface and extending longitudinally therealong;

(4) a retaining edge positioned between said compression surface and said outer surface and extending therealong and being spatially disposed oppositely from said securement edge;

(5) a plurality of securement tabs secured to said securement edge and extending outwardly therefrom, said securement tabs being attachable to the panel surrounding the panel penetrating member to facilitate holding of said sealing member into abutment with and surrounding the panel penetrating member;

(6) a first end area including an engagement prong means extending outwardly therefrom, each of said engagement prong means being formed by stamping thereof from said first end area of said mounting strap, each of said engagement prong means being flexibly resilient and moveable relative to said first end area of said mounting strap, each of said engagement prong means being tapered and including a wider prong section immediately adjacent said mounting strap and attached directly thereto, each of said engagement prong means further including a narrower prong section integrally formed with said wider prong section and extending outwardly therefrom spatially disposed from the location of attachment of said wider prong section to said first end area of said mounting strap, the length direction of the engagement prong means being perpendicular to the length direction of the mounting strap; and (7) a second end area spatially disposed from said first end area along said mounting strap and defining a plurality of individual engagement aperture means therein positioned longitudinally therealong, each of said engagement aperture means being capable of receiving one of said engagement prong means extending thereinto for engagement therewith in order to selectively affix said first end area and said second end area together with said mounting strap extending around said sealing member in abutment with the panel penetrating member for biasing them together to facilitate sealing therearound, each of said engagement aperture means being positioned spatially disposed longitudinally with respect to one another along said second end area of said mounting strap to facilitate adjustability in sizing thereof to facilitate use of said mounting strap with panel penetrating members of various sizes and configurations, each of said engagement aperture means being tapered to define wider aperture end section and a narrower aperture end section contiguous with respect to one another to facilitate engagement thereof by one of said engagement prong means which are tapered, said narrower prong section being flexibly positionable extending into said wider aperture end section to facilitate entry of said engagement prong means into said engagement aperture means, said engagement prong means being flexible to position said wider prong section thereof into said narrower aperture end section for abutting engagement therebetween for facilitating engagement of said engagement prong means with respect to said engagement aperture means, the length direction of the engagement aperture means being perpendicular to the length direction of the mounting strap.

2. A universal firestopping collar assembly for sealing about a panel penetrating member as defined in claim 1 further comprising a plurality of retaining projections secured to said retaining edge of said mounting strap and extending away therefrom along said sealing member to facilitate retaining thereof in securement with respect to said compression surface of said mounting strap for further urging thereof into surrounding abutment with respect to the panel penetrating member.

3. A universal firestopping collar assembly for sealing about a panel penetrating member as defined in claim 2 wherein said retaining projections extend inwardly from said retaining edge oriented approximately perpendicularly with respect to said compression surface to retain said sealing member in position against said compression surface for facilitating guiding thereof into engaging abutment surrounding the panel penetrating member.

4. A universal firestopping collar assembly for sealing about a panel penetrating member as defined in claim 1 wherein each of said securement tabs includes a securement aperture means defined therein to facilitate securement of said mounting strap with respect to the panel surrounding the panel penetrating member.

5. A universal firestopping collar assembly for sealing about a panel penetrating member as defined in claim 1 wherein said second end area of said mounting strap is positionable extending overlapping said outer surface of said first end area of said mounting strap to facilitate engagement between said engagement prong means and selectively one of said engagement aperture means.

6. A universal firestopping collar assembly for sealing about a panel penetrating member as defined in claim 1 wherein said frangible zones on said sealing member include member perforations to facilitate breaking of said sealing member laterally thereacross.

7. A universal firestopping collar assembly for sealing about a panel penetrating member as defined in claim 1 wherein said frangible zones on said sealing member include member slits extending laterally at least partially across said sealing member to facilitate breaking laterally thereacross.

8. A universal firestopping collar assembly for sealing about a panel penetrating member as defined in claim 1 wherein each of said engagement prong means includes an inner prong member and an outer prong member spatially disposed laterally with respect to one another across said outer surface of said first end area of said mounting strap and extending outwardly from said outer surface thereof to facilitate securement with respect to one of said engagement aperture means defined in said second end area of said mounting strap.

9. A universal firestopping collar assembly for sealing about a panel penetrating member as defined in claim 8 wherein each of said engagement aperture means includes an inner engagement aperture and an outer engagement aperture each being spatially disposed laterally with respect to one another across said second end area of said mounting strap, said inner prong member being adapted to extend through said inner engagement aperture and said outer prong member being adapted to extend through said outer engagement aperture to facilitate engagement between said first end area and said second end area of said mounting strap for affixing thereof surrounding said sealing member for urging said sealing member against a panel penetrating member therewithin.

10. A universal firestopping collar assembly for sealing about a panel penetrating member as defined in claim 1 wherein each of said engagement prong means is movable into engagement with respect to one of said engagement aperture means by extending therethrough and being capable of being bent downwardly extending over said outer surface of said mounting strap for securemnent therewith.

11. A universal firestopping collar assembly for sealing about a panel penetrating member as defined in claim 1 wherein said engagement prong means engages said engagement aperture means by extending therethrough and being bent downwardly over said outer surface of said mounting strap toward said retaining edge thereof for securement therewith.

12. A universal firestopping collar assembly for sealing about a panel penetrating member as defined in claim 1 wherein said sealing member is made of a firestopping foam material operable to prevent passage of smoke therethrough.

13. A universal firestopping collar assembly for sealing about a panel penetrating member as defined in claim 1 wherein said sealing member is made of a firestopping intumescent foam material to enhance firestopping characteristics thereof.

14. A universal firestopping collar assembly for sealing about a panel penetrating member as defined in claim 1 wherein second end area defines a first engagement aperture means, a second engagement aperture means, a third engagement aperture means and a fourth engagement aperture means each being spatially disposed therealong longitudinally with respect to one another and wherein said sealing member defines a first frangible zone, a second frangible zone and a third frangible zone each being spatially disposed therealong longitudinally with respect to one another, wherein said first engagement aperture means is defined at a position along said second end area of said mounting strap to extend around said sealing member for sealing around a generally circular panel penetrating member having a diameter of approximately four and one-half inches, and wherein said second engagement aperture means is defined at a position along said second end area of said mounting strap to extend around said sealing member broken through said first frangible zone thereof for sealing around a generally circular panel penetrating member having a diameter of approximately four inches, and wherein said third engagement aperture means is defined at a position along said second end area of said mounting strap to extend around said sealing member broken through said second frangible zone thereof for sealing around a generally circular panel penetrating member having a diameter of approximately three and one-half inches, and wherein said fourth engagement aperture means is defined at a position along said second end area of said mounting strap to extend around said sealing member broken through said third frangible zone thereof for sealing around a generally circular panel penetrating member having a diameter of approximately three inches.

15. A universal firestopping collar assembly for sealing about a panel penetrating member as defined in claim 1 wherein said frangible zones of said sealing member are defined along said sealing member in order to allow said sealing member to seal substantially completely around a panel penetrating member responsive to engagement of said engagement prong means with respect to any one of the plurality of said engagement aperture means to facilitate sealing around various sizes and configurations of panel penetrating members.

16. A universal firestopping collar assembly for sealing about a panel penetrating member as defined in claim 1 wherein said mounting strap is made of a flexible steel material.

* * * * *